UNITED STATES PATENT OFFICE.

PAUL CHAILLAUX, OF PARIS, FRANCE.

MANUFACTURE OF GOLD-COLORED SULPHURS AND VERMILIONS OF ANTIMONY.

1,417,033.  Specification of Letters Patent.  Patented May 23, 1922.

No Drawing.  Application filed June 23, 1920.  Serial No. 391,207.

*To all whom it may concern:*

Be it known that I, PAUL CHAILLAUX, engineer, of Paris, France, residing at Paris, 2$^{bis}$ Rue Caumartin, have invented an Improved Manufacture of Gold-Colored Sulphurs and Vermilions of Antimony, of which the following is a specification.

This invention has for its object an improved process for the manufacture, by dry-process, of gold-colored sulfides and vermilions of antimony.

The said process consists in melting in a closed vessel natural sulfide of antimony, (having the chemical formula $Sb_2S_3$), by raising it to a suitable temperature, and then passing into the mass a current of atmospheric air.

According to the temperature at which the operation is carried out, the product obtained, (having the chemical formula $Sb_2S_5$) has a golden coloration (gold-colored sulfide of antimony) or a crimson coloration (vermilion of antimony).

The reaction is as follows:

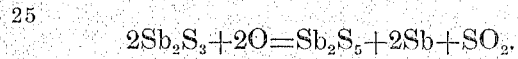

$$2Sb_2S_3 + 2O = Sb_2S_5 + 2Sb + SO_2.$$

The gold-colored sulfides and the vermilions of antimony are produced in the state of powder and are collected in a settling chamber that allows only the gas given off in the reaction to escape.

The sulfurous acid obtained by the aforesaid reaction may be easily used for several purposes as, for instance, the production of sulfites or of sulfuric acid.

I claim as my invention:—

A process for the manufacture, by dry-process, of gold-colored sulfides and vermilion of antimony consisting in melting natural sulfide of antimony, $Sb_2S_5$, in a closed vessel, and then passing a current of atmospheric air through the melted mass while maintaining said mass at a temperature corresponding to the coloration desired for the sulfide, $Sb_2S_5$, to be obtained.

In testimony whereof I have signed my name to this specification in the presence of two subscribing witnesses.

PAUL CHAILLAUX.

Witnesses:
JULES FAYOLLET,
ANDRÉ BORDILLON.